United States Patent [19]

Ishibashi et al.

[11] Patent Number: 5,080,001
[45] Date of Patent: Jan. 14, 1992

[54] RESIN MOLDED PRODUCT, METHOD OF PRODUCING SAME, AND AIR VENT DEVICE USING SAME

[75] Inventors: Yoshiyuki Ishibashi; Hideo Takahashi; Akihiko Isomura, all of Osaka, Japan

[73] Assignee: Sumitomo Electric Industries Ltd., Osaka, Japan

[21] Appl. No.: 376,463

[22] Filed: Jul. 7, 1989

[30] Foreign Application Priority Data

Jul. 9, 1988 [JP] Japan .................................. 63-171625
Jul. 15, 1988 [JP] Japan .................................. 63-94219
Dec. 29, 1988 [JP] Japan .................................. 63-170783
Apr. 28, 1989 [JP] Japan .................................. 63-51489

[51] Int. Cl.$^5$ .................................................. F24F 7/00
[52] U.S. Cl. .................................... 454/370; 55/159; 55/385.4
[58] Field of Search .................... 98/1; 210/321.6; 220/353, 352; 215/355; 55/385.4, 159, 487

[56] References Cited

U.S. PATENT DOCUMENTS

4,238,207 12/1980 Ruschke ................................ 55/159
4,835,013 8/1989 Rio et al. ............................... 55/159

FOREIGN PATENT DOCUMENTS

10372 1/1956 Fed. Rep. of Germany ........ 55/159

Primary Examiner—Harold Joyce
Attorney, Agent, or Firm—Sughrue, Mion, Zinn, Macpeak & Seas

[57] ABSTRACT

A resin molded product is provided comprising a membrane having at least one opening formed therethrough. The resin molded product includes a molded body having a pair of first and second portions joined respectively to opposite sides of the membrane, the molded body having at least one connective portion interconnecting the pair of first and second portions and disposed in the opening. The membrane is either of a nonporous construction or a porous construction having a pore size of not more than 100 μm. In addition, a method of producing the resin molded product is provided. The resin molded product of the invention is suited for an air vent device, a filter, a diaphragm device, or the like.

10 Claims, 5 Drawing Sheets

RESIN MOLDED PRODUCT, METHOD OF PRODUCING SAME, AND AIR VENT DEVICE USING SAME

FIELD OF THE INVENTION

This invention relates generally to a resin molded product and a method of producing the same, and more particularly to a resin molded product suited to, for example, an air vent device (breather valve), a filter, a diaphragm device, etc., and a method of producing the same. This invention also relates to air vent devices which employ such a resin molded product, can be easily attached to a container by press-fitting, can restrain breakage and clogging in a membrane of the air vent device, and are best suited for use in combination with a container holding liquid.

BACKGROUND OF THE INVENTION

Conventionally, a resin molded product, having molded portions disposed respectively on opposite sides of a rigid, thick membrane, has been manufactured in the following manner.

Figure 3A:
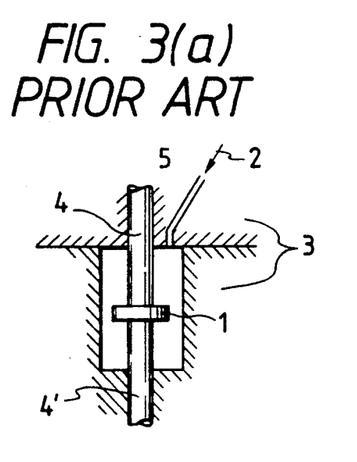
FIG. 3(a) is a cross-sectional view showing a molding operation for producing a conventional molded product incorporating a thick membrane.
Figure 3B:
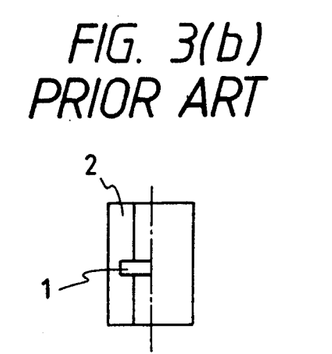
FIG. 3(b) is a front-elevational view of the conventional molded product of FIG. 3(a)
Figure 4A:
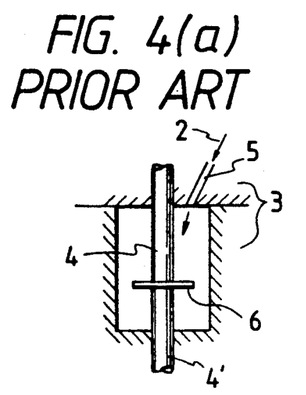
FIG. 4(a) is a cross-sectional view showing an initial stage of a conventional molding method employing a thin membrane.
Figure 4B:
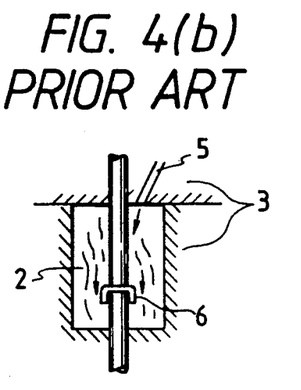
FIG. 4(b) is a view similar to FIG. 4(a), but showing an intermediate stage of the molding operation.
Figure 4C:
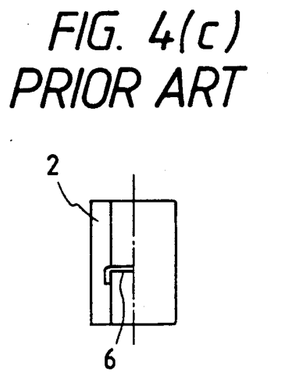
FIG. 4(c) is a front-elevational view of a molded product produced by the conventional molding method of FIGS. 4(a) and 4(b)

As shown in FIG. 3, a thick membrane 1 disposed within a cavity of molds 3 is clamped between core pins 4 and 4', and a desired resin molded product is produced by injection molding. FIG. 3(a) shows such injection molding, and FIG. 3(b) is a cross-sectional, front-elevational view of the resin molded product. Reference numeral 2 denotes the resin, and reference numeral 5 denotes a gate for supplying the resin. However, when instead of a thick membrane, a thin membrane is employed with the above conventional molding method, the thin membrane is deformed by the pressure of the injected resin. As a result, the membrane is not retained or held by the resultant molded product, as shown in FIG. 4, thus failing to provide the desired molded product. FIG. 4(a) shows an initial stage of the injection molding, and FIG. 4(b) shows an intermediate stage of such injection molding, and FIG. 4(c) is a cross-sectional, front-elevational view of the molded product. In FIG. 4, reference numeral 2 denotes the resin, reference numeral 3 denotes a mold, reference numerals 4 and 4, denote core pins, and reference numeral 5 denotes a gate.

To overcome the above difficulty, the following procedures have been proposed.

Figure 5A:
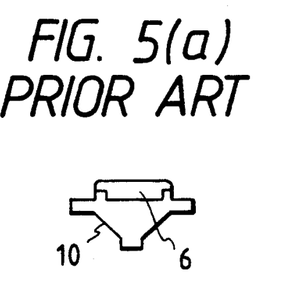
FIGS. 5(a) and 5(b) are views showing a conventional molding method.
Figure 5B:
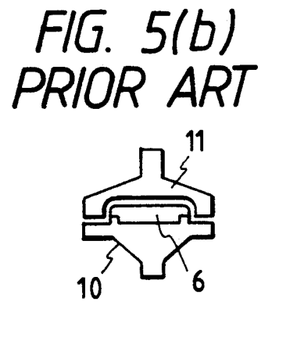

(1) As shown in FIG. 5, a thin membrane 6 is fused or heat-bonded to a molded part 10, and then another molded part 11 is secured to the molded part 10 by ultrasonic welding.

Figure 6A:
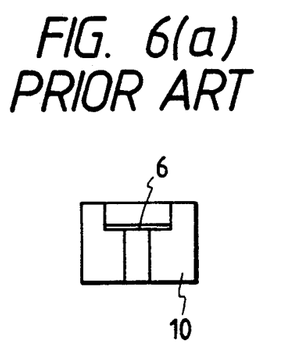
FIGS. 6(a) and 6(b) are views showing a conventional molding method.
Figure 6B:
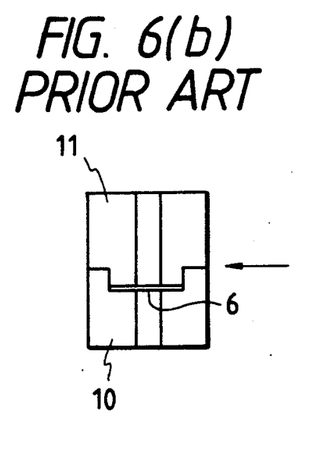

(2) Alternatively, as shown in FIG. 6, flanges of molded parts 10 and 11 are enlarged, and the two molded parts are joined together by ultrasonic welding (as indicated by an arrow), with a thin membrane 6 held therebetween.

However, procedure (1) above is costly, and procedure (2) above is not satisfactory because it results in high cost and an increased size of the parts.

An air vent device is known which is both gas permeable and water-proof, and comprises a housing of a resin and a porous membrane of polytetrafluoroethylene (PTFE) or the like bonded to the resin housing by heat welding or ultrasonic welding.

However, in the case where the porous membrane is bonded to the resin housing which is rigid, a seal material or an adhesive sealant must be used to provide an air-tight seal between the air vent device and a container when mounting the air vent device on the container.

Also, in the case where the porous membrane is bonded to the resin housing of a flexible or soft nature by heat welding or ultrasonic welding, the housing is susceptible to deformation so that a gap tends to develop between the porous membrane and the housing, thus failing to provide a water-proof seal.

SUMMARY OF THE INVENTION

It is therefore an object of this invention to provide a resin molded product which eliminates the above deficiencies of the prior art and is suited for an air vent device, a filter, a diaphragm device and the like, and also to provide a method of producing such a resin molded product.

Other objects and effects of this invention will be apparent from the following description.

According to a first aspect of the present invention, a resin molded product is provided comprising a membrane having at least one opening formed therethrough. In addition, the resin molded product includes a molded body having a pair of first and second portions joined respectively to the opposite sides of the membrane, the molded body having at least one connective portion interconnecting the pair of first and second portions and disposed in the opening. The membrane is either of a non-porous construction or of a porous construction having a pore size of not more than 100 $\mu$m.

According to a second aspect of the present invention, a method of producing a resin molded product is provided comprising a membrane having at least one opening formed therethrough. The method includes producing a molded body having a pair of first and second portions joined respectively to the opposite sides of the membrane, the molded body having at least one connective portion interconnecting the pair of first and second portions and disposed in the opening, and the membrane is either of a non-porous construction or of a porous construction having a pore size of not more than 100 $\mu$m. The method is characterized in that the molded body is injection molded by passing a molding resin through the opening formed through the membrane.

When injection molding the resin molded product, the molding resin passes or flows through the opening formed through the membrane, and therefore the membrane is not subjected to deformation. This enables the manufacture of a molded product of a compact size and a desired shape.

Since the molding resin flows through the opening formed through the membrane, the molded product having the molded portions between which the membrane is interposed can be easily produced at a low cost.

According to a third aspect of the present invention, an air vent device is provided comprising a water-repellent porous membrane having at least one opening formed therethrough. The air vent device includes an inner cylindrical resin member of a rigid nature formed through the opening and has a pair of upper and lower portions joined respectively to upper and lower sides of the membrane. Also included is an outer cylindrical resin member of a soft nature formed on the outer surface of the inner cylindrical resin member to cover the same, the membrane and the inner and outer cylindrical resin members being joined into a unitary construction.

According to a fourth aspect of the present invention, an air vent device is provided comprising a water-repellent porous membrane having at least one opening formed therethrough. The air vent device includes an inner cylindrical resin member of a rigid nature formed through the opening and having a pair of upper and lower portions joined respectively to upper and lower sides of the membrane. Also included is an outer cylindrical resin member of a soft nature formed on an outer peripheral surface of the inner cylindrical resin member to cover the same, and an open-cell foam filled in a bore of the inner cylindrical resin member and disposed on the upper side of the membrane, the membrane and the inner and outer cylindrical resin members being joined into a unitary construction.

According to a fifth aspect of the present invention, an air vent device is provided comprising a laminate of a water-repellent porous membrane and a sheet held in contact with a lower surface of the porous membrane, the porous membrane having at least one opening formed therethrough, and the porous membrane having fine pores formed therethrough. The sheet has coarse pores formed therethrough, and a cylindrical resin member is formed through the opening and has a pair of upper and lower portions joined respectively to the upper and lower sides of the laminate. The device is characterized in that the lower portion of the cylindrical resin member joined to the sheet has an inner diameter smaller than an inner diameter of the upper portion of the cylindrical resin member joined to the water-repellent porous membrane. The length of the lower portion of the cylindrical resin member extending between the sheet and a lower end of the lower portion is greater than the inner diameter of the lower portion.

According to a sixth aspect of the present invention, an air vent device is provided comprising a laminate of a water-repellent porous membrane and a sheet held in contact with a lower surface of the porous membrane, the porous membrane having at least one opening formed therethrough, and the porous membrane having fine pores formed therethrough. The sheet has coarse pores formed therethrough, and an inner cylindrical resin member of a rigid nature is formed through the opening and has a pair of upper and lower portions joined respectively to the upper and lower sides of the laminate. An outer cylindrical resin member of a soft nature is formed on at least an outer peripheral surface of the inner cylindrical resin member, the laminate and the inner and outer cylindrical resin members being joined into a unitary construction. The device is characterized in that the lower portion of the inner cylindrical resin member joined to the sheet has an inner diameter smaller than an inner diameter of the upper portion of the inner cylindrical resin member joined to the water-repellent porous membrane. When an opening at the lower end of the outer cylindrical resin member is equal to or greater than an inner diameter of the upper portion of the inner cylindrical resin member joined to the porous membrane, the length of the lower portion of the cylindrical resin member extending between the sheet and a lower end of the lower portion is greater than the inner diameter of the lower portion. Alternatively, when the opening at the lower end of the outer cylindrical resin member is smaller than the inner diameter of the upper portion of the inner cylindrical resin member, the distance between the sheet and the lower end of the outer cylindrical resin member is greater than the inner diameter of the lower portion.

DESCRIPTION OF THE PREFERRED EMBODIMENTS OF THE INVENTION

The invention will now be described with reference to the drawings.

Figure 1A:
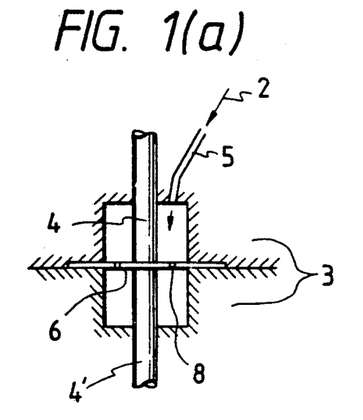
FIG. 1(a) is a cross-sectional view showing a molding operation for producing a resin molded product according to the present invention.
Figure 1B:
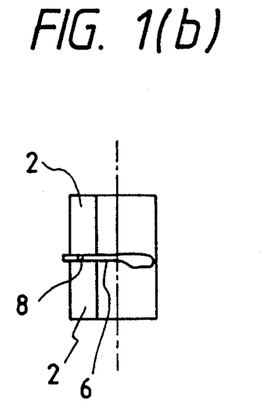
FIG. 1(b) is a partly cross-sectional, front-elevational view of the resin molded product.

A resin molded product shown in FIG. 1(b) includes a molded body of a resin 2 which has a pair of molded portions joined respectively to opposite sides of a thin membrane 6, and connective portions interconnecting the pair of molded portions. The thin membrane 6 has openings 8 (e.g., apertures) formed therethrough, and the connective portions of the molded body are disposed in the openings 8, respectively.

Since the molding resin 2 can pass through the openings 8 of the thin membrane 6 during injection molding, the molded portions on the opposite sides of the thin membrane 6 are formed integrally with each other through the connective portions without deforming the membrane 6 even if the membrane is thin, and the problems as mentioned above with reference to FIGS. 4, 5 and 6 are not encountered.

As shown in FIG. 1(a), the thin membrane 6, having the openings 8 serving as passages for the resin 2, is clamped between two molds 3 and also between two core pins 4, and the desired resin molded product can be obtained by injection molding.

With this molding method, the passages 8 (i.e., the openings) for the resin 2 are provided through the thin membrane 6, and the the membrane 6 is held between the molds 3 and also between the core pins 4. Therefore, the membrane 6 is not subjected to deformation when carrying out the injection molding. Also, the thin membrane 6 is retained in position by the connective portions of the resin 2 disposed respectively in the openings 8 of the membrane. In FIG. 1, reference numeral 5 denotes a gate.

In the case where the thin membrane 6 is porous, the pore size or diameter should be not more than 100 μm. The reason is that if the pore size exceeds 100 μm, there is no need to provide the passages for the resin in the membrane. The term "thin membrane" here means such a membrane having a thickness of not more than 2 mm.

Figure 2A:
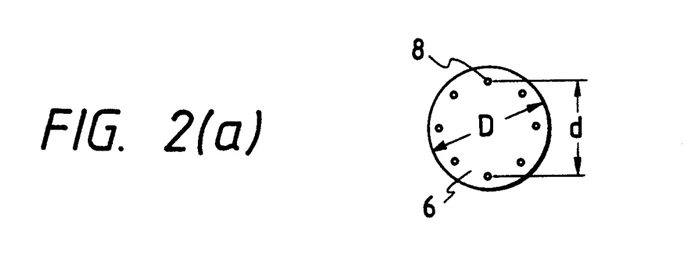
FIG. 2(a) is a plan view of a thin membrane.
Figure 2B:
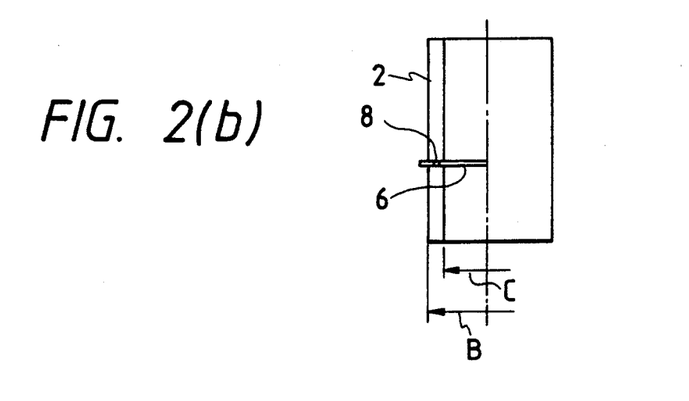
FIG. 2(b) is a partly cross-sectional, front-elevational view of an intermediate molded product according to the present invention.
Figure 2C:
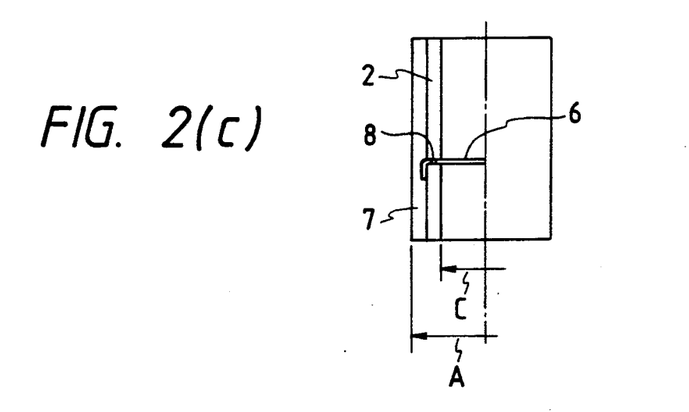
FIG. 2(c) is a partly cross-sectional, front-elevational view of a final form of the product of FIG. 2(b)

The invention will now be illustrated by way of the following Example with reference to FIGS. 1 and 2.

According to the following procedure, a molded product was prepared using a porous membrane (manufactured by Sumitomo Denko Co., under the tradename of "Polyflon FP-100") of polytetrafluoroethylene having a pore size of 1 μm and a thickness of 0.1 mm, and a polypropylene resin (manufactured by Sumitomo Chemical Co., under the tradename of "Noblen").

(1) A circle of eight apertures or openings 8 were formed through a circular membrane 6 (Polyflon) at an equal interval in concentric relation to the circular membrane (see FIG. 2(a)), the circular membrane 6 having a diameter of 12 mm, the circle of apertures 8 having a diameter of 9 mm, and each aperture 8 having a diameter of 0.1 mm. Then, the membrane 6 was clamped between two core pins 4 and also between two molds 3, and a polypropylene resin 2 was injected (see FIG. 1(a)) to mold a resin molded product (see FIG. 2(b)).

(2) The resin molded product thus obtained was put in another mold, and an outer layer of a polypropylene resin 7 was molded on the outer surface of the resin molded product (see FIG. 2(c)). In FIG. 2, the diameter A is 12 mm, the diameter B is 10 mm, and the diameter C is 8 mm.

With this method, the thin membrane 6 could accurately and easily be positioned between the opposite molded portions. The outer layer 7 may be formed of a resin different from the resin of the body of the molded product. The size and number of the resin-passing openings 8 are suitably varied depending on the kind of resin to be used.

Figure 7:
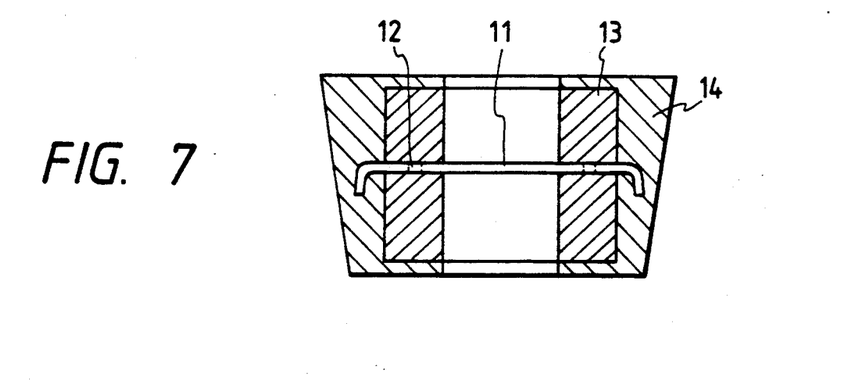
FIG. 7 is a cross-sectional view of an air vent device provided in accordance with the present invention.

FIG. 7 shows an air vent device (hereinafter referred to as "first air vent device") provided in accordance with the present invention. The air vent device is formed by providing a water-repellent porous membrane 11 of a circular shape made, for example, of PTFE and having at least one opening 12 formed through the membrane in its circumferential direction (for example, a plurality of slits 12 spaced from one another in the circumferential direction). A resin is caused to flow through the slits 12 to form an inner cylindrical resin member 13 of a rigid nature having upper and lower portions firmly joined respectively to the opposite sides of the water-repellent porous membrane 11. An outer cylindrical resin member 14 is formed of a soft nature on the outer peripheral surface of the inner cylindrical resin member 13. The air vent device thus produced is of a unitary or integral construction.

Figure 8:
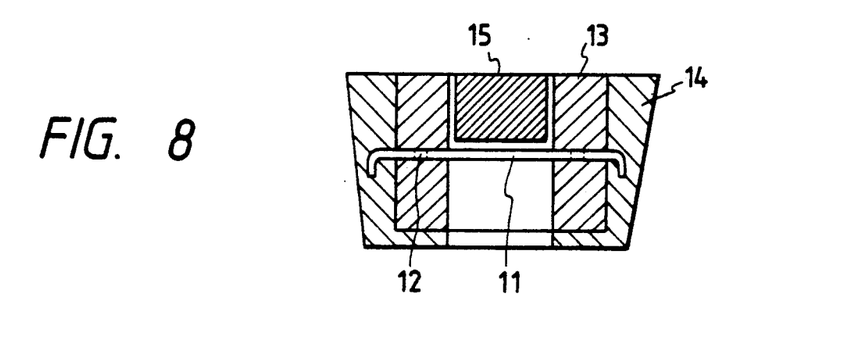
FIGS. 8, 9, 10(a) and 10(b) are views similar to FIG. 7, but showing modified air vent devices, respectively.

FIG. 8 shows a modified air vent device (hereinafter referred to as "second air vent device") which differs from the first air vent device of FIG. 7 mainly in that an open-cell foam 15 is filled in the internal space or bore of the upper portion of the inner cylindrical resin member 13.

Thus, the foam 15 is disposed on the upper side of the porous membrane 11 so as to prevent the membrane 11 from becoming clogged by mud, dirt and the like intruding from the upper end of the inner cylindrical resin member 13, and also to prevent foreign matters from impinging on the membrane to damage or break the membrane.

When the foam 15 of a predetermined shape is to be filled in the inner cylindrical resin member 13, this can be easily done, for example, by pressing the foam 15 into the resin member 13.

In the first and second air vent devices, the resin can be poured through the openings or slit 12 formed through the water-repellent porous membrane 11, so that the membrane can be positively retained or held in position. The inner cylindrical resin member 13 of a rigid nature, having the upper and lower portions joined respectively to the opposite sides of the porous membrane 11, can be easily molded into a predetermined shape at a low cost.

The provision of the outer cylindrical resin member 14 of a soft nature around the inner cylindrical resin member 13 of a rigid nature facilitates the press-fitting of the air vent device into a hole of a container when the air vent device is mounted on the container.

As described above, the provision of the open-cell foam 15 in the inner cylindrical resin member 13 on the upper side of the porous membrane 11 prevents the clogging of the membrane 11 by mud, dirt and the like, and also prevents the breakage of the membrane 11 by impingement of foreign matters on the membrane 11.

The water-repellent porous membrane 11 used in the present invention can comprise a porous membrane of PTFE, polypropylene or the like having fine pores formed therethrough. If necessary, non-woven fabrics or the like can be laminated on such porous membrane. The opening or openings 12 through the porous membrane can be in any suitable shape such for example as a slit, a round hole or a cut.

The inner cylindrical resin member 13 of a rigid nature can be made of an ordinary plastics material such as polyethylene, polypropylene and polyacetal. To retain a required rigidity, preferably, the resin member 13 should have a compression modulus of elasticity of not less than 3,000 kg/cm$^2$.

The outer cylindrical resin member 14 of a soft nature can be made of a resin material having rubber elasticity such as olefin elastomer, urethane elastomer, urethane rubber or silicon rubber. To maintain an air-tight seal between the air vent device and the container, preferably, the resin member 14 should have a compression modulus of elasticity of not more than 3,000 kg/cm$^2$.

The open-cell foam 15, filled in the upper portion of the inner cylindrical resin member 13 and disposed on the upper side of the porous membrane 11, can be made of a sponge-like material such as urethane foam and polyolefin foam.

Since the outer cylindrical resin member 14 is adapted to be press-fitted in a hole formed in the container, it is preferred that the outer resin member 14 have a tapered outer peripheral surface to facilitate such press-fitting. It is also preferred that projections be formed on the outer peripheral surface of the outer resin member 14 to prevent the air vent device from becoming disengaged from the container after such press-fitting.

Figure 9:
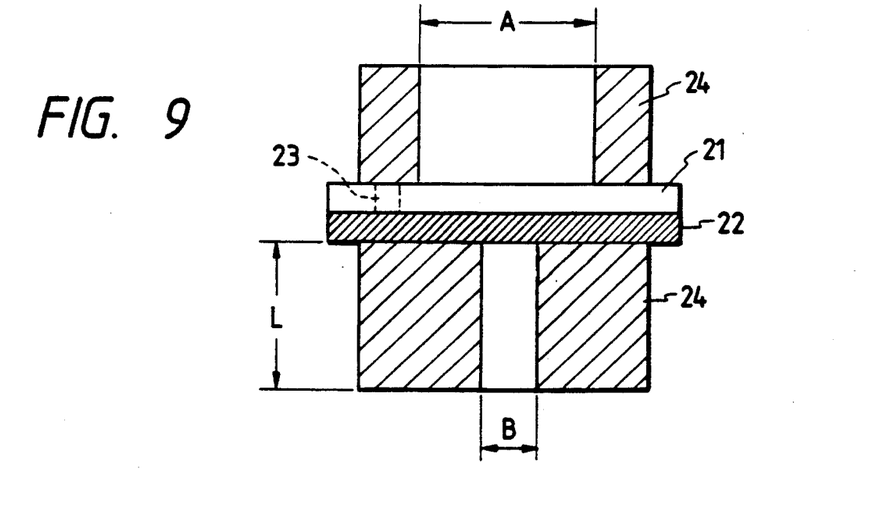

FIG. 9 shows another modified air vent device (hereinafter referred to as "third air vent device"). This air vent device comprises a laminate composed of a water-repellent porous membrane 21 of fine porosity and a sheet 22 of coarse porosity disposed in contact with the lower face or side of the membrane 21, and a cylindrical resin member 24 having upper and lower portions joined respectively to the opposite sides of the laminate. The porous membrane 21 has fine pores formed therethrough, and the sheet 22 has coarse pores formed therethrough. The laminate composed of the porous membrane 21 and the sheet 22 has an opening 23 formed therethrough. When molding the air vent device, the resin passes or flows through the opening 23 to form the cylindrical resin member 24.

In FIG. 9, the upper portion of the cylindrical resin member 24 joined to the water-repellent porous membrane 21 has an inner diameter A, and the lower portion of the cylindrical resin member 24 joined to the sheet 22 has an inner diameter B. The diameter A is greater than the diameter B. The lower portion of the cylindrical resin member 24 extending between the sheet 22 and the lower end of the resin member 24 has a length L. (L/B) is equal to or greater than 1.

Figures 10A, 10B:
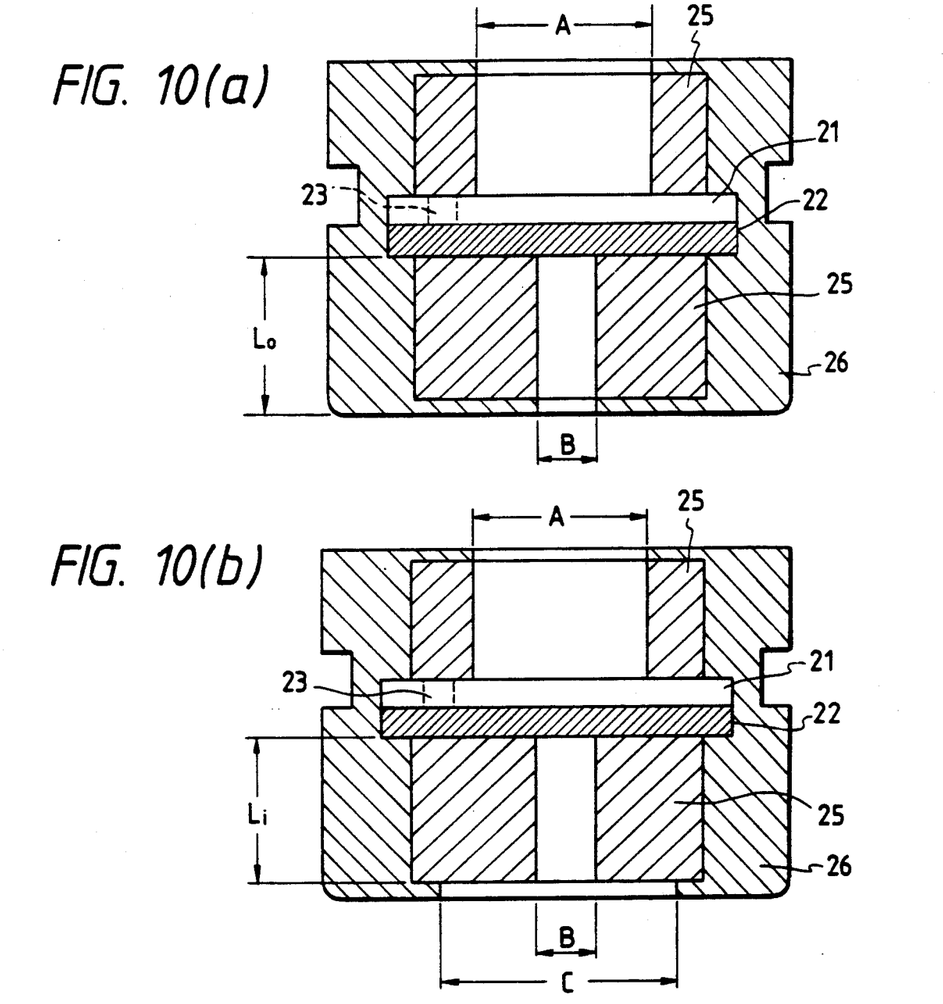

FIG. 10 shows a further modified air vent device (hereinafter referred to as "fourth air vent device"). This air vent device comprises a laminate composed of a water-repellent porous membrane 21 and a sheet 22 disposed in contact with the lower face or side of the membrane 21, an inner cylindrical resin member 25 of a rigid nature having upper and lower portions joined respectively to opposite sides of the laminate, and an outer cylindrical resin member 26 of a soft nature formed on and covering the outer surface of the inner cylindrical resin member 25. The porous membrane 21 has fine pores formed therethrough, and the sheet 22 has coarse pores formed therethrough. The laminate composed of the porous membrane 21 and the sheet 22 has an opening 23 formed therethrough. When molding the air vent device, the resin passes or flows through the opening 23 to form the inner cylindrical resin member 25. The outer cylindrical resin member 26 has upper and lower openings of a circular shape.

In FIG. 10, reference character A denotes the inner diameter of the upper portion of the inner cylindrical resin member 25, and reference character B denotes the inner diameter of the lower portion of the inner cylindrical resin member 25. The diameter A is greater than the diameter B.

The diameter C of the lower opening of the outer cylindrical resin member 26 is not limited. In FIG. 10(a), one embodiment is disclosed in which the diameter A is greater than the diameter C. In FIG. 10(b), one embodiment is disclosed in which the diameter C is greater than the diameter A. Also, the diameter C may be greater than, equal to or smaller than the diameter B.

Reference character $L_o$ (FIG. 10(a)) denotes the distance between the sheet 22 and the lower end of the outer cylindrical resin member 26. ($L_o$/B) is equal to or greater than 1. The lower portion of the inner cylindrical resin member 25 extending between the sheet 22 and the lower end of the resin member 25 has a length $L_i$ (FIG. 10(b)). ($L_i$/B) is equal to or greater than 1.

Figure 11:
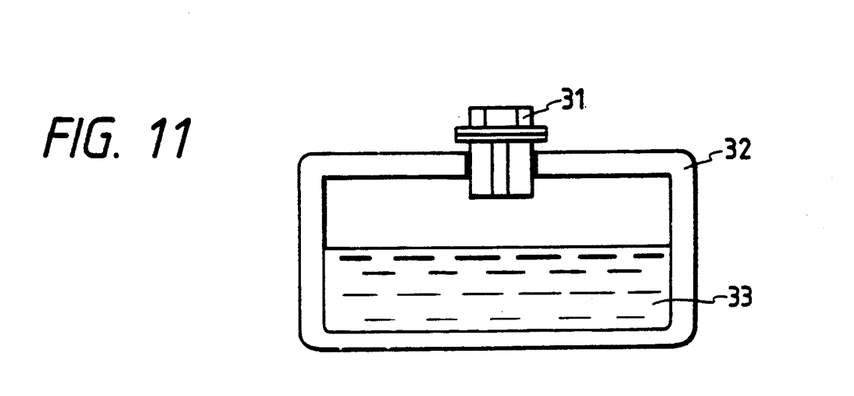
FIG. 11 is a cross-sectional view of a container having the air vent device of the present invention mounted thereon.

The air vent device of the present invention designated by reference numeral 31 in FIG. 11 is adapted to be mounted on a container 32 holding a liquid 33 therein.

As described above, according to the present invention, the molded resin product has the pair of molded portions joined respectively to the opposite sides of the membrane 6, and even if the membrane 6 is thin, the molded product can be formed into a desired, compact construction without deforming the membrane 6.

According to the molding method of the present invention, the resin molded product incorporating the membrane 6 can be easily manufactured at a low cost.

In the case where a porous membrane is used as the membrane, the resin molded product can be provided at a low cost, for example, as an air vent device or a filter with excellent air-tightness.

In the case where rubber is used as the membrane, the molded product can be used as a diaphragm device.

The opening or openings formed through the membrane can be of any shape such as a slit, a round aperture or a suitable cut.

The first and second air vent devices of the present invention comprise the inner cylindrical resin member 13 of a rigid nature formed by passing the resin through the openings 12 and serving as a core member for the outer cylindrical resin member 14 of a soft nature formed on the outer surface of the inner resin member 13. With this construction, excellent air-tightness between each resin member and the membrane 11 is achieved, and the air vent device can be easily press-fitted in the hole of the container.

By virtue of the provision of the open-cell foam 15 mounted within the inner cylindrical resin member 13 on the upper side of the membrane 11, the second air vent device of the present invention has an additional advantage that the membrane 11 is less liable to undergo breakage and clogging.

In the third and fourth air vent devices of the present invention, the ratio of the length L, $L_o$ or $L_i$ to the inner diameter B of the lower portion of the inner resin member is greater than 1 (that is, the inner bore of the lower portion of the inner resin member is elongated). With this construction, even when the liquid contained in the container splashes due to vibration or the like and intrudes into the inner bore of the inner resin member, the liquid will not reach to the membrane due to a compression effect of the air present in the inner bore. Thus, the membrane will not get wet by the liquid, and therefore the function of the air vent device will not be affected.

Further, when the ventilation membrane of the air vent device comprises a laminate of the water-repellent porous membrane 21 of fine porosity and the sheet 22 of coarse porosity, an effective membrane area can achieve improved ventilation since the the greater inner bore of the air vent device disposed exteriorly of the container functions more effectively.

Further, in the air vent devices of the present invention, the membrane, having the ventilation function, and the membrane-holding member are joined together simultaneously when molding the membrane-holding member. Therefore, the cost is reduced.

The fourth air vent device of FIG. 10 can be easily press-fitted in the hole of the container.

The third and fourth air vent devices can have a splash prevention function while maintaining an adequate amount of air flow, without the need for an additional part such as a splash prevention plate.

While the invention has been described in detail and with reference to specific examples thereof, it will be apparent to one skilled in the art that various changes and modifications can be made therein without departing from the spirit and scope thereof.

What is claimed is:

1. A resin molded product comprising: a membrane having at least one opening formed therethrough; a molded body having a pair of first and second portions joined respectively to opposite sides of said membrane, said molded body having at least one connective portion interconnecting said pair of first and second portions and disposed in said opening.

2. A resin molded product as claimed in claim 1, wherein said membrane is of a porous construction having a pore size of not more than 100 μm.

3. A resin molded product as claimed in claim 1, wherein said membrane is a non-porous construction.

4. A resin molded product as claimed in claim 1, wherein said membrane completely separates said pair of first and second portions except at a location of said at least one connective portion.

5. A resin molded product as claimed in claim 2, wherein said membrane completely separates said pair of first and second portions except at a location of said at least one connective portion.

6. A resin molded product as claimed in claim 2, wherein said membrane completely separates said pair of first and second portions except at a location of said at least one connective portion.

7. An air vent device comprising: a water-repellent porous membrane having at least one opening formed therethrough; an inner cylindrical resin member of a rigid nature formed through said opening and having upper and lower portions joined respectively to upper and lower sides of said membrane; and an outer cylindrical resin member of a soft nature formed on an outer peripheral surface of said inner cylindrical resin member to cover the same, said membrane and said inner and outer cylindrical resin members being joined into a unitary construction.

8. An air vent device as claimed in claim 7 further including an open-cell foam filled in a bore of said inner cylindrical resin member and disposed on said upper side of said membrane.

9. An air vent device comprising: a laminate of a water-repellent porous membrane and a sheet contacting a lower surface of said porous membrane, said porous membrane having at least one opening formed therethrough, said porous membrane having fine pores formed therethrough, and said sheet having coarse pores formed therethrough; and a cylindrical resin member formed through said opening and having upper and lower portions joined respectively to the upper and lower sides of said laminate; wherein said lower portion of said cylindrical resin member joined to said sheet has an inner diameter smaller than an inner diameter of said upper portion of said cylindrical resin member joined to said water-repellent porous membrane; and wherein the length of said lower portion of said cylindrical resin member extending between said sheet and a lower end of said lower portion is greater than said inner diameter of said lower portion.

10. An air vent device comprising: a laminate of a water-repellent porous membrane and a sheet held in contact with a lower surface of said porous membrane, said porous membrane having at least one opening formed therethrough, said porous membrane having fine pores formed therethrough, and said sheet having coarse pores formed therethrough; an inner cylindrical resin member of a rigid nature formed through said opening and having upper and lower portions joined respectively to the upper and lower sides of said laminate; and an outer cylindrical resin member of a soft nature formed on at least an outer peripheral surface of said inner cylindrical resin member; said laminate and said inner and outer cylindrical resin members being joined into a unitary construction, wherein said lower portion of said inner cylindrical resin member joined to said sheet has an inner diameter smaller than an inner diameter of said upper portion of said inner cylindrical resin member joined to said water-repellent porous membrane; and wherein when an opening at the lower end of said outer cylindrical resin member is equal to or greater than an inner diameter of said upper portion of said inner cylindrical resin member joined to said porous membrane, the length of said lower portion of said inner cylindrical resin member extending between said sheet and a lower end of said lower portion is greater than said inner diameter of said lower portion; alternatively, when said opening at the lower end of said outer cylindrical resin member is smaller than the inner diameter of said upper portion of said inner cylindrical resin member; the distance between said sheet and the lower end of said outer cylindrical resin member is greater than said inner diameter of said lower portion.

* * * * *